US009678494B2

(12) United States Patent
Hyde et al.

(10) Patent No.: US 9,678,494 B2
(45) Date of Patent: Jun. 13, 2017

(54) SYSTEMS AND METHODS FOR CONTROLLING LIGHTING BASED ON A DISPLAY

(71) Applicant: Elwha LLC, Bellevue, WA (US)

(72) Inventors: Roderick A. Hyde, Redmond, WA (US); Nathan P. Myhrvold, Bellevue, WA (US); Tony S. Pan, Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/677,778

(22) Filed: Apr. 2, 2015

(65) Prior Publication Data

US 2016/0295663 A1    Oct. 6, 2016

(51) Int. Cl.
   *H05B 37/02*      (2006.01)
   *G05B 15/02*      (2006.01)

(52) U.S. Cl.
   CPC ........... *G05B 15/02* (2013.01); *H05B 37/029* (2013.01); *H05B 37/0218* (2013.01)

(58) Field of Classification Search
   CPC ..................... H05B 37/0227; H04N 21/43615
   USPC ................................. 315/291, 294, 297, 307
   See application file for complete search history.

(56) References Cited

U.S. PATENT DOCUMENTS

| 6,564,108 B1* | 5/2003 | Makar .................. H05B 37/029 382/254 |
| 2004/0105264 A1 | 6/2004 | Spero |
| 2005/0132408 A1* | 6/2005 | Dahley ................. H04N 7/142 725/80 |
| 2013/0285937 A1* | 10/2013 | Billings ................. H04L 51/32 345/173 |
| 2013/0290233 A1* | 10/2013 | Ferren ................. G06K 9/3266 706/46 |
| 2015/0058877 A1* | 2/2015 | Lakkundi ............. H04N 21/439 725/19 |
| 2015/0061506 A1* | 3/2015 | Baaijens ................... G02F 1/29 315/152 |
| 2015/0089551 A1* | 3/2015 | Bruhn .................... H04N 7/106 725/80 |
| 2015/0091473 A1* | 4/2015 | Clavenna, II ...... H05B 37/0227 315/297 |

* cited by examiner

*Primary Examiner* — Jason M Crawford

(57) ABSTRACT

The present disclosure provides systems and methods associated with controlling lighting based on a presentation display, such as a television, mobile device, white board, etc. The disclosed embodiments can involve a lighting system, a presentation display, a monitoring system, and a controller. The lighting system provides light to an area and may include a light source and an adjustment mechanism to adjust the light source. The lighting system can include natural light sources and/or artificial light sources. The adjustment mechanism may adjust, for example, one or more of an intensity, orientation, polarization, color, flicker rate, polarization, and other characteristics of the light source. The presentation display can be monitored by a monitoring system to monitor a status of the presentation display. The controller processes the status of the presentation display and signal the adjustment mechanism to adjust the light source, based on the status of the presentation display.

28 Claims, 5 Drawing Sheets

SYSTEMS AND METHODS FOR CONTROLLING LIGHTING BASED ON A DISPLAY

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

None

RELATED APPLICATIONS

If the listings of applications provided herein are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The present disclosure relates to systems and methods for controlling lighting. Specifically, the disclosure provides systems and methods for controlling lighting based on a display.

SUMMARY

Systems and methods for controlling lighting based on a presentation display are disclosed. The disclosed embodiments, for example, may involve a lighting system, a presentation display, a monitoring system, and a controller.

The lighting system provides light to an area and may include a light source and an adjustment mechanism to adjust the light source. The lighting system may include ambient lighting, decorative lighting, task lighting, and/or any combination thereof. The lighting system may also include natural light sources, artificial light sources, and/or a combination thereof. The adjustment mechanism may adjust, for example, one or more of an intensity, orientation, polarization, color, flicker rate, and other characteristics of the light source.

The presentation display may be any device capable of presenting content. The presentation display, for example, may be a video display (e.g., a television, computer monitor), a handheld electronic device (e.g., a smartphone, tablet), a projection screen, or the like.

The presentation display may be monitored by a monitoring system to detect or otherwise determine a status of the presentation display. The status of the presentation display may be an operational status, an intensity, a location, an orientation, and/or other status, attribute, and/or characteristic of the presentation display.

The controller may process the status of the presentation display and signal the adjustment mechanism of the lighting system to adjust the light source, based on the status of the presentation display.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
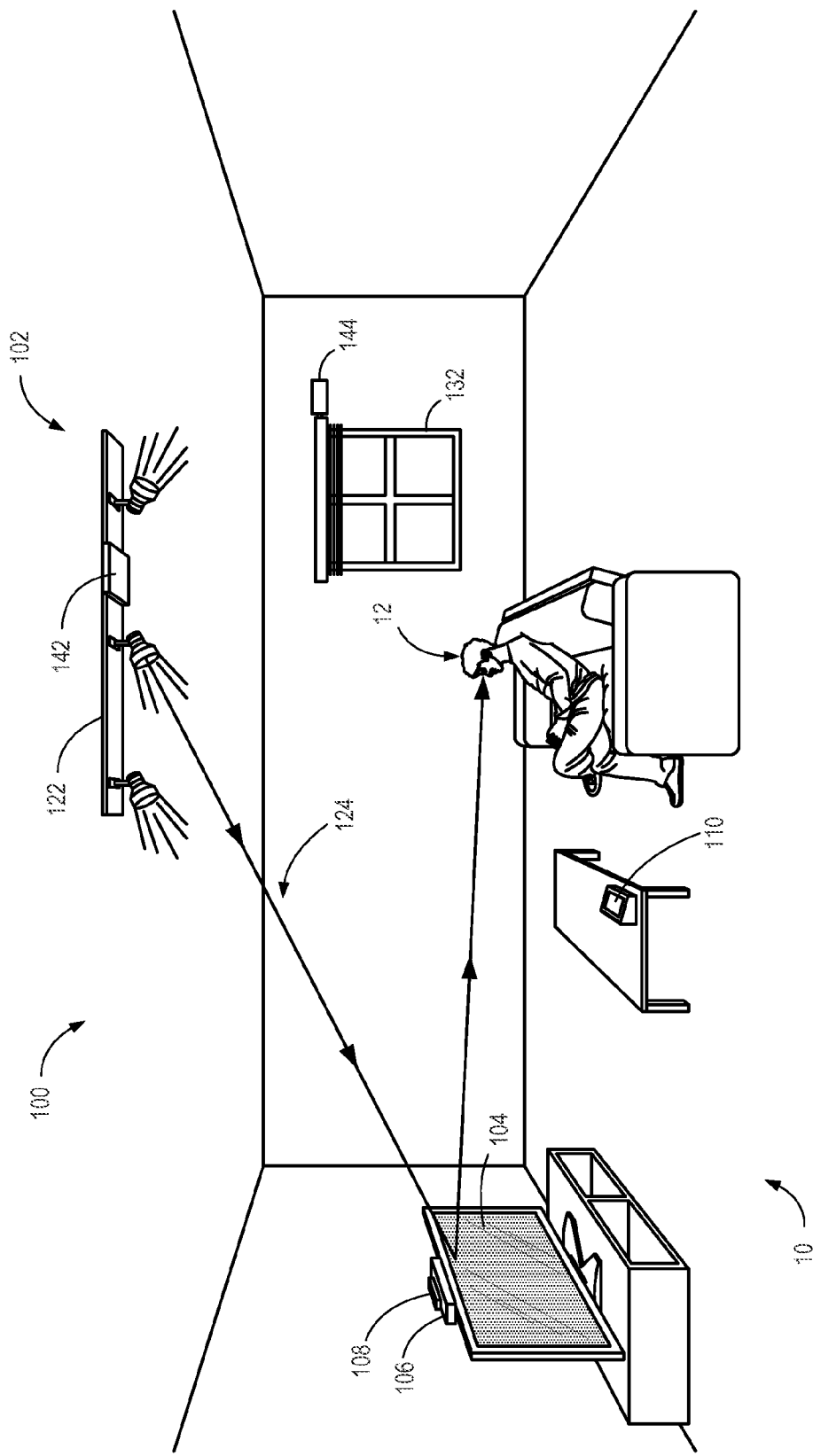
FIG. 1 is a system for controlling lighting, according to one embodiment of the present disclosure, when the operational status of the presentation display is "off."

Lighting impacts an experience. For example, lighting in the vicinity of a presentation display can impact a viewer experience. The light sources may be purposefully arranged or configured in a way that may enhance viewing of the presentation display. However, such arranged and configured light sources may detract from other experiences, such as reading or social interaction. In other circumstances, light sources may be purposefully arranged or configured to enhance an ambiance. However, such arranged and configured light sources may result in glare on a presentation display, such as a television. Generally, light sources are fixed, such that they are not configurable based on a desired experience. Or light sources must be manually configured, such as by dimming using a dimmer switch.

The present inventors have recognized that an experience of a viewer of a presentation display can be enhanced by controlling lighting based on a presentation display. As used herein, lighting may refer to an effect achieved (e.g., light emitted) by a configuration or arrangement of one or more light sources of a lighting system. Disclosed herein are systems and methods for controlling lighting based on a status and/or characteristic of a presentation display. The disclosed embodiments, for example, may include one or more of a presentation display, a lighting system, a monitoring system to monitor a status of the presentation display, and a controller to process the status and generate a command for an adjustment mechanism to adjust the lighting system based on the status of the presentation display.

The presentation display may be an electronic display, such as a video display (e.g., television), a computer monitor, a tablet computing device, a handheld electronic device, a smartphone, or an electronic reading machine. The presentation display may also be a non-electronic display, such as a movie projection screen, a chalk board, a white board, or the like. The presentation display may be positioned within the illumination region of the lighting system.

The lighting system provides light to an area and may include a light source and an adjustment mechanism to adjust the light source. The area may be a room or more simply an illumination region. The lighting system may include an ambient lighting system to provide overall lighting to a room, an accent lighting system to provide decorative lighting, a task lighting system to facilitate performance of a task (e.g., reading, drawing, painting, photographing), and/or any combination thereof. The lighting system may also include natural light sources, artificial light sources, and/or a combination thereof. A natural light source may be, for example, a window, a skylight, a light shelf, an optic redirecting daylight, or the like. The artificial light source may be any of a variety of types of light bulbs (e.g., incandescent, halogen, gaseous discharge, light emitting diode) or a light fixture including a plurality of light bulbs. The lighting system may be portable, such that it is configured to be positioned in a room to provide lighting in the room. The lighting system may be permanently installed in a room, and the presentation display may be portable and positioned in the room with the lighting system. The lighting system may comprise indoor lighting.

The adjustment mechanism of the lighting system may adjust, for example, one or more of the intensity, orientation, polarization, color, spectral power distribution, focus, direction, flicker rate, and other characteristics of the light source. The adjustment may be made based on a status of the presentation display, a type of the presentation display, a user of the presentation display, the user's location, and other considerations. The adjustment mechanism may adjust the light source to increase light emitted in a visibility area of the presentation display, to decrease light emitted in a visibility area of the presentation display, to increase light from the light source impacting a display surface of the presentation display, to decrease light from the light source impacting the display surface of the presentation display, to decrease light from the light source that reflects from the display surface of the presentation display to a user of the presentation display, to adjust a direction of the light source toward a user of the presentation display, to adjust a direction of the light source toward the display, to adjust a direction of the light source away from the display, and/or to adjust a focus of the light source. The adjustment mechanism may adjust the flicker rate of the light source to correspond to a refresh rate of the presentation display or to correspond to a capture rate of a camera associated with the presentation display. The adjustment mechanism may adjust the flicker rate of the light source according to one or more user preferences for the present status of the presentation display. The adjustment mechanism may include any one or more of a motor, an electronic dimmer, a mechanical dimmer (e.g., attenuator, shutter), a reflector, a shade, a polarization filter, a power setting for light emitted by the illumination source, and a spectral filter.

The monitoring system monitors a status of the presentation display. The monitoring system may include sensors, a processing device, and data inputs and outputs. The sensors may include, but are not limited to, light sensors and other optical sensors, heat sensors and other temperature sensors, imagers, motion detectors, and any other sensors adaptable to detect a change in status of a presentation display. The monitoring system may be internal to, a component of, or otherwise integral to the presentation display. The monitoring system integrated to the presentation display may access memory and/or data stores of the presentation display to directly obtain a status of the presentation display. The monitoring system integrated to the presentation display, alternatively or in addition, may receive signals from components of the presentation display to directly determine a status of the presentation display. In other embodiments, the monitoring system may be a separate component from the presentation display. The sensors of the monitoring system may indirectly detect a status of the presentation display. For example, light sensors may detect light emitted by the presentation display.

The status of the presentation display monitored by the monitoring system may include an operational status, such as an "on" status or an "off" status. The status may include a location of the presentation display in the area (e.g., the room). The location of the presentation display may be supplied by a user, or determined by a beacon, global positioning system (GPS) receiver, other location determining system, or the like. The status may include an orientation of a presentation display, for example, an orientation of a mobile presentation display relative to a light source of the lighting system. The status may include an illumination characteristic of the presentation display, such as a polarization characteristic, active illumination, passive illumination, and directed illumination from the presentation display to a user of the presentation display. An intensity of the light source may be reduced if the operational status of the presentation display is active illumination. An intensity of the light source may be increased if the operational status of the presentation display is passive illumination. The status may include a status of an external light source that is external to the presentation display and external to the illumination system, such as the external light source directing light toward the presentation display or the external light source directing light toward a user viewing the presentation display. The status of the presentation display comprises an intensity of the presentation display, such as an angular intensity profile, and intensity derived based on a brightness setting, a quantity of light being emitted, and/or an amount of power being consumed by the presentation display. The status may include a level of color in light being emitted by the presentation display, such as a level of red, blue, and/or green. The status may include a relative level of a plurality of colors. The level of color may be derived based on a color setting and/or a wavelength of light emitted. The status may include a polarization of light emitted or reflected from the presentation display. The status may include a refresh rate of the presentation display. The status, or portions of the status, may be supplied to the monitoring system by the user.

The controller may process the status of the presentation display to determine an adjustment to the lighting system. The adjustment may be determined based on one or more of the status of the presentation display and/or one or more parameters. The controller may process the status of the presentation display and signal the adjustment mechanism of the lighting system to adjust a light source, based on the status of the presentation display. The controller may signal the adjustment mechanism over a communication network, such as a wireless communication channel. The controller may signal the adjustment mechanism based on a type of the presentation display, a user of the presentation display, the user's location, and other considerations. The controller may signal the adjustment mechanism based on a user preference for a present status of the presentation display. The controller may signal the adjustment mechanism based on room lighting control parameters, for example supplied by a user, by the presentation display, or by a database over a network. The lighting control parameters may depend on one or more of a type, a surface coating, reflectivity, user characteristics, and/or illumination region characteristics, The controller may signal the adjustment mechanism to adjust an intensity of the light source. The controller may signal the adjustment mechanism to adjust the light source to increase light emitted in a visibility area of the presentation display, to decrease light emitted in a visibility area of the presentation display, to increase light from the light source impacting a display surface of the presentation display, to decrease light from the light source impacting the display surface of the presentation display, or to decrease light from the light source reflecting from the display surface of the presentation display to a user of the presentation display.

The controller may signal the adjustment mechanism to adjust a direction of the light source. The controller may signal the adjustment mechanism to adjust a direction of the light source away from a user of the presentation display, toward a user of the presentation display, toward the display, or away from the display. The controller may signal the adjustment mechanism to adjust a focus of the light source, and/or adjust an orientation of the light source. The controller may signal the adjustment mechanism to adjust the flicker rate of the light source, for example to correspond to a refresh rate of the presentation display or to correspond to a capture rate of a camera associated with the presentation display. The controller may signal the adjustment mechanism to adjust the flicker rate of the light source according to one or more user preferences for the present status of the presentation display. The controller may signal the adjustment mechanism to adjust one or more of a polarization of light emitted by the light source, a spectral power distribution of light emitted by the light source, a color of light emitted by the light source, and/or a combination of colors of light emitted by the light source.

The controller may process the status of the presentation display based on room lighting control parameters. The room lighting control parameters may be supplied by a user, supplied by the presentation display, and/or retrieved from a database. The room lighting control parameters may be dependent on a type of the presentation display, dependent on a surface coating of the presentation display, or dependent on a reflectivity of the presentation display. The room lighting control parameters may be dependent on characteristics of a user of the presentation display and/or characteristics of the area to which the illumination system provides light.

The controller may be a separate component, distinct from the monitoring system and other components of the system. In other embodiments, the controller may be integrated with the monitoring system. For example, the controller and the monitoring system may be embodied together in a single component.

The system for controlling lighting of an illumination area may include a user interface. The user interface may present information concerning the lighting control system, such as a status monitored by the monitoring system, an action or instructions provided to the lighting system by the controller, and a current state (e.g., before or after an adjustment) of the lighting system. The user interface may be a separate component that may include one or more of a touch screen, a remote control, a switch, a mouse, and a handheld or tablet computing device, or the like. The user interface may be repositionable or portable. In other embodiments, the user interface may be in a fixed location. For example in some embodiments, the user interface may be a terminal attached to a wall. In some embodiments the user interface may be integrated into the controller. In other embodiments the user interface may be part of the presentation display. In still other embodiments the user interface may be a tablet computer or a cellular phone. In other embodiments, the user interface may also include other system components, including but not limited to the monitoring system, the controller, and/or the lighting system.

In some embodiments, the system for controlling lighting of an illumination area may include a presentation display interface, a controller, and a lighting interface. The display interface may receive data indicating a status of a presentation display, for example, from the presentation display, from a network, from a user, or the like. The controller can process the data indicating the status of the presentation display and generate a command to transmit to a lighting system. The command may indicate to adjust lighting generated by the lighting system. The command may be generated based on the status of the presentation display. The lighting interface can transmit the command to a lighting system configured to receive the command and effectuate an adjustment of the lighting provided by the lighting system, according to the command.

In some embodiments, a presentation display includes a monitoring system, a controller, and a lighting interface. The monitoring system monitors a status of the presentation display. The controller processes the status of the presentation display and generates a command to transmit to a lighting system. The command indicates an adjustment to the lighting that is provided by the lighting system. The controller generates the command based on the status of the presentation display. The lighting interface transmits the command to a lighting system configured to receive the command and effectuate an adjustment of a light source of the lighting system.

In some embodiments, the system for controlling lighting of an illumination area may include a lighting system, a presentation display, a monitoring system, and a controller. The lighting system provides light to an area. The lighting system includes a light source and an adjustment mechanism to adjust the light source. The monitoring system monitors a status of the presentation display. The monitoring system may be disposed external to the presentation display. For example, the monitoring system may be a component configured to plug into a port of the presentation display. As another example, the monitoring system may be a component configured to be positioned remote from and unconnected to the presentation display, such as on a table or shelf, coupled to or integrated with the lighting system, coupled to or integrated into a user interface component, or the like. The monitoring system may include sensors to detect a status of the presentation display. For example, the monitoring system may detect electro-magnetic interference (EMI) generated by the presentation display. The controller may receive the status of the presentation display from the monitoring system. The controller processes the status of the presentation display to signal the lighting system to adjust the light source, based on the status of the presentation display. The controller may signal the lighting system to activate the adjustment mechanism.

In some embodiments, a lighting system includes a light source, a display detector, and an adjustment mechanism. The light source emits light to provide a region of illumination. The display detector may be a monitoring system with sensors configured to detect a presentation display in the room and determine a status of the presentation display. The adjustment mechanism adjusts the light source, based on the determined status of the presentation display. The lighting system may further include a controller to process the status of the presentation display and determine a command and/or an appropriate adjustment to signal or otherwise provide to the adjustment mechanism.

In some embodiments of a method for controlling lighting of an illumination area a status of a presentation display is monitored. The monitoring may be performed by a monitoring device and/or system internal to the presentation display. The monitoring may be performed by a monitoring device and/or system external to the presentation display. The status of the presentation display is processed to determine an adjustment to a light source of a lighting system associated with the presentation display. The adjustment may be determined based on the status of the presentation display, the lighting system to provide light to an area. The light source of the lighting system may then be adjusted according to the determined adjustment.

In some embodiments, a computer-readable storage medium, such as a non-transitory storage medium, may have stored thereon instruction that, when executed by a computing device, cause the computing device to perform operations for controlling lighting. The operations can include monitoring a status of a presentation display. The monitoring may be internal to, integrated with, and/or external to (remote from) the presentation display. The operations can include determining an adjustment to a light source of a lighting system associated with the presentation display. The adjustment may be determined based on processing the status of the presentation display. The adjustment is determined based on the status of the presentation display. The operations can include adjusting the light source of the lighting system according to the determined adjustment.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other handheld computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 illustrates a lighting control system 100, according to one embodiment, in a room 10. The lighting control system 100 may include a lighting system 102, a presentation display 104, a monitoring system 106, a controller 108, and a user interface 110. The lighting control system 100 may control lighting based on a status of the presentation display 104. The lighting control system 100 may determine the status of the presentation display 104 based on input from the presentation display 104 or from another status input source. In FIG. 1, the operational status of the presentation display 104 is "off" and light provided by the lighting system 102 is being directed throughout the room 10, including toward the presentation display 104. In some embodiments the lighting control system 100 may be able to monitor the operational status of the presentation display 104 and control the lighting based on the status of the presentation display 104. For example when the status of the presentation display 104 is "off" the lighting control system 100 may light the room 10 fully to accommodate a user 12 (or users) of the room 10.

The lighting system 102 provides illumination to an area, such as the room 10, or another illumination region. The lighting system 102 may include one or more artificial light sources 122 (e.g., electric lamp/bulb, light fixture including a plurality of electric lamps/bulbs). The lighting system 102 may also include one or more natural light sources 132 (e.g., window, sky light, light shelf, optic to direct/redirect sunshine). The lighting system 102 may be configured for a specific function or purpose, such as task lighting, decorative lighting, or accent lighting. The light sources 122,132 in the lighting system 102 may be fixed or they may be configurable. In some embodiments the light sources 122, 132, may include one or more types or qualities of lighting. For example the artificial light sources 122 may include incandescent, fluorescent, LED, or other types of lighting. The natural light sources 132 may include windows, skylights, light shelves, and/or light directing optics. The light sources 122, 132 may be decorative. Alternatively or in addition, the light sources 122, 132 may be functional. The lighting system 102 may also include one or more adjustment mechanisms 142, 144 to adjust the one or more light sources 122, 132. The light sources 122, 132 are adjustable. For example, the adjustment mechanism 142 may alter one or more of the intensity, color, flicker rate, polarization, and/or direction of the artificial light source 122. As another example, the adjustment mechanism 144 may lower a shade to adjust the natural light source 132. The lighting system 102 may in some embodiments be built into (e.g., recessed lighting) or otherwise integrally installed in the lighting area, such as the room 10. In other embodiments the lighting system 102 may be installed after construction. The lighting system 102 may, in some embodiments, be altered or rearranged after initial installation.

The presentation display 104 may be configured to present information and/or content. In FIG. 1, the presentation display 104 is a flat screen television. The presentation display 104 may also be monitored for and/or otherwise characterized by its status. The status of the presentation display 104 may determine or impact operation of the lighting control system 100. The status may include various types of information concerning the presentation display 104. For example in some embodiments the status may indicate if the display is "on" or "off." In FIG. 1, the presentation display is "off." The status may also include information about the location, color, intensity, position, or flicker rate of the presentation display 104. Based on these and other status characteristics of the presentation display 104, the lighting control system 100 may adjust the lighting system 102. For example, in some embodiments the lighting control system 100 may adjust a direction or intensity of lighting produced by the lighting system 102. In some embodiments, the lighting control system 100 may adjust the flicker rate of the lighting system 102 to match the flicker rate of the presentation display 104. In some embodiments the lighting control system 100 may alter the color of light emitted by the lighting system 102 according to the status of the presentation display 104.

As can be appreciated, other types of presentation displays besides the flat screen television presentation display 104 shown in FIG. 1 are possible. The presentation display 104 may be any type of display used to present information or content. The presentation display 104 should not be limited by type, size, number of displays, etc. In some embodiments there may be one presentation display 104 or many. The presentation display 104 may be altered or changed by a user 12. The presentation display 104 may be electronic or it may be non-electronic. In some embodiments the presentation display 104 may occupy a fixed location. For example, the presentation display 104 may be a television, a computer monitor, a projector screen, a white board, or a chalkboard. In other embodiments the presentation display 104 may be mobile. For example, the presentation display 104 may be a tablet computer or a cellular phone.

The monitoring system 106 monitors a status (e.g., one or more status characteristics) of the presentation display 104. For example the monitoring system 106 may detect light emitted by the display 104 through a sensor (e.g., a camera or a photodetector). In other embodiments the monitoring system 106 may receive the display status directly from the presentation display 104. The monitoring system 106 may be built into the presentation display 104 or may be inside of a separate component. The monitoring system 106 may monitor the display status directly or indirectly. For example, monitoring system 106 may monitor the status of the display 104 directly through data input from or provided to the monitoring system 106 by the presentation display 104. The monitoring system 106 may monitor the display status indirectly, for example, through a sensor (or sensor network) coupled to the monitoring system 106.

In the embodiment of FIG. 1, the monitoring system 106 monitor the status of the presentation display 104, including an operational status characteristic (e.g., whether the display is "on" or "off"). The status monitored by the monitoring system 106 may also include other status characteristics, including but not limited to location, direction, position, polarization, color(s) of light being emitted by the presentation display 104, intensity, brightness, or flicker rate, and other information concerning the presentation display 104. The monitoring system 106 may also receive parameters, for example from the presentation display 104 and/or a user 12. For example, the presentation display 104 may broadcast make/model information, which the monitoring system 106 may receive and use to determine one or more status characteristics of the presentation display 104. The monitoring system 106 may also utilize parameters that may be preprogrammed or otherwise configured. For example, system parameters for the lighting control system 100 may be set or otherwise configured or the monitoring system 106 may be preprogrammed with a make/model of the presentation display 104, and use such parameters to derive status characteristics.

The monitoring system 106 of the embodiment of FIG. 1 is a separate device coupled to the presentation display 104, which may facilitate direct monitoring of the presentation display 104 by receiving or otherwise accessing status data. However, the monitoring system 106 may be located wherever it may facilitate functionality of the lighting control system 100. For example, in some embodiments the monitoring system 106 may be integrated into the presentation display 104 (e.g., a component of a television). In some embodiments, the monitoring system 106 may be configured to be positioned separate from other components of the lighting control system 100, and within the illumination region (e.g., the room 10) a distance in front of the presentation display 104 to monitor or otherwise detect the status of the presentation display 104. In some embodiments, the monitoring system 106 may be integrated with one or more components of the lighting control system 100, including but not limited to the presentation display 104, the lighting system 102, the controller 108, and the user interface 110. Based on the status of the presentation display 104 as monitored by the monitoring system 106, the lighting control system 100 may adjust the lighting system 102.

The controller 108 processes the monitored status of the presentation display 104 and signals to, for example, the lighting system 102 and/or the adjustment mechanisms 142, 144 to adjust the lighting system 102 based on the status of the presentation display 104. In the embodiment of FIG. 1, the controller 108 is coupled to the monitoring system 106, to facilitate communication between the monitoring system 106 and the controller 108. However, the controller 108 may be located wherever it may facilitate functionality of the lighting control system 100. For example, in some embodiments the controller 108 may be integrated into the monitoring system 106 and/or the presentation display 104 (e.g., a component of a television). In some embodiments, the controller 108 may be remote from the monitoring system 106 and may wirelessly communicate with the monitoring system 106 to receive a current status of the presentation display 104 for processing. In some embodiments, the controller 108 may be integrated into the lighting system 102 to communicate directly with the adjustment mechanisms 142, 144.

The controller 108 may make changes to the lighting system 102 based on preprogrammed parameters or input from the user interface 110. The controller 108 may receive input (e.g., configuration input or parameters) from a user interface 110. The input from the user interface 110 may specify parameters and/or indicate an action the controller 108 is to take based on a present monitored status of the presentation display 104 and/or change thereof. For example in one embodiment, when the status of the presentation display 104 is "off," the controller 108 may adjust the lighting system 102 to direct light toward the presentation display 104, and when the status of the presentation display 104 is "on," the controller 108 may direct light away from the presentation display 104. The controller 108 may direct the lighting system 102 in any manner that may be desirable, convenient, and/or useful to a viewer of the presentation display 104 of the lighting control system 100, or otherwise configurable.

The user interface 110 may enable the user 12 to provide input or parameters to the lighting control system 100, such as to the controller 108. The user interface 110 may present information concerning the lighting control system 100, such as a status monitored by the monitoring system 106, an action or instructions provided to the lighting system 102 by the controller 108, and a current state (e.g., before or after an adjustment) of the lighting system 102. In the embodiment of FIG. 1, the user interface 110 is a separate component that may include one or more of a touch screen, a remote control, a switch, a microphone, a mouse, and a handheld or tablet computing device, or the like. The user interface 110 is repositionable or mobile.

In other embodiments, the user interface 110 may be in a fixed location. For example in some embodiments, the user interface 110 may be a terminal attached to a wall. In some embodiments the user interface 110 may be integrated into the controller 108. In other embodiments the user interface 110 may be part of the presentation display 104. In still other embodiments the user interface 110 may be a tablet computer or a cellular phone. In other embodiments, the user interface 110 may also include other system components, including but not limited to the monitoring system 106, the controller 108, and/or the lighting system 102.

The lighting system 102, the presentation display 104, the monitoring system 106, the controller 108, and the user interface 110, in FIG. 1, may be separate devices. In other embodiments, two or more of these components may be combined into a single device. For example the presentation display 104, the monitoring system 106, the controller 108, and the user interface 110 may be combined in a single device. As another example, the lighting system 102, the monitoring system 106, and the controller 108 may be combined in a single device.

In the embodiment of FIG. 1, the lighting control system 100 may direct lighting toward the presentation display 104 when the status of the presentation display 104 is "off" and direct lighting away from the presentation display 104 when the status of the presentation display 104 is "on." The lighting control system 100 may determine a status of the presentation display 104 through the monitoring system 106. The controller 108 may obtain or otherwise receive a status of the presentation display 104 from the monitoring system 106 and signal the lighting system 102 (e.g., including the adjustment mechanism(s) 142, 144) to automatically adjust, based on the status of the presentation display 104. The controller 108 may also consider any system parameters which may be configured from the user interface 110 to signal the lighting system 102 to automatically adjust based on the display status and the system parameters.

FIG. 1 illustrates the lighting control system 100 where the operational status of the presentation display 104 is "off." A portion of light 124 produced by the lighting system 102 is being directed toward the presentation display 104 and reflecting to produce a glare off the presentation display 104 within a view of the user 12, or otherwise impacting viewing of the presentation display 104. The impact may be of little concern to the user 12 when the presentation display 104 is not operational, such as when the presentation display 104 has an operational status of "off." For example when the status of the presentation display 104 is "off," as in FIG. 1, the lighting control system 102 may light the room 10 to accommodate the user 12 of the room 10.

The lighting control system 100 can monitor the operational status of the presentation display 104. For example in one embodiment the monitoring system 106 may detect light emitted by the presentation display 104 through a sensor. In the case of FIG. 1, where the operational status of the presentation display 104 is "off," the monitoring system 106 may detect that no light is emitted by the presentation display 104. In other embodiments the monitoring system 106 may receive data input indicating the status directly from the presentation display 104. When the status of the presentation display 104 is changed to "on," such as in FIG. 2, the monitoring system 106 detects the change in the operational status.

Figure 2:
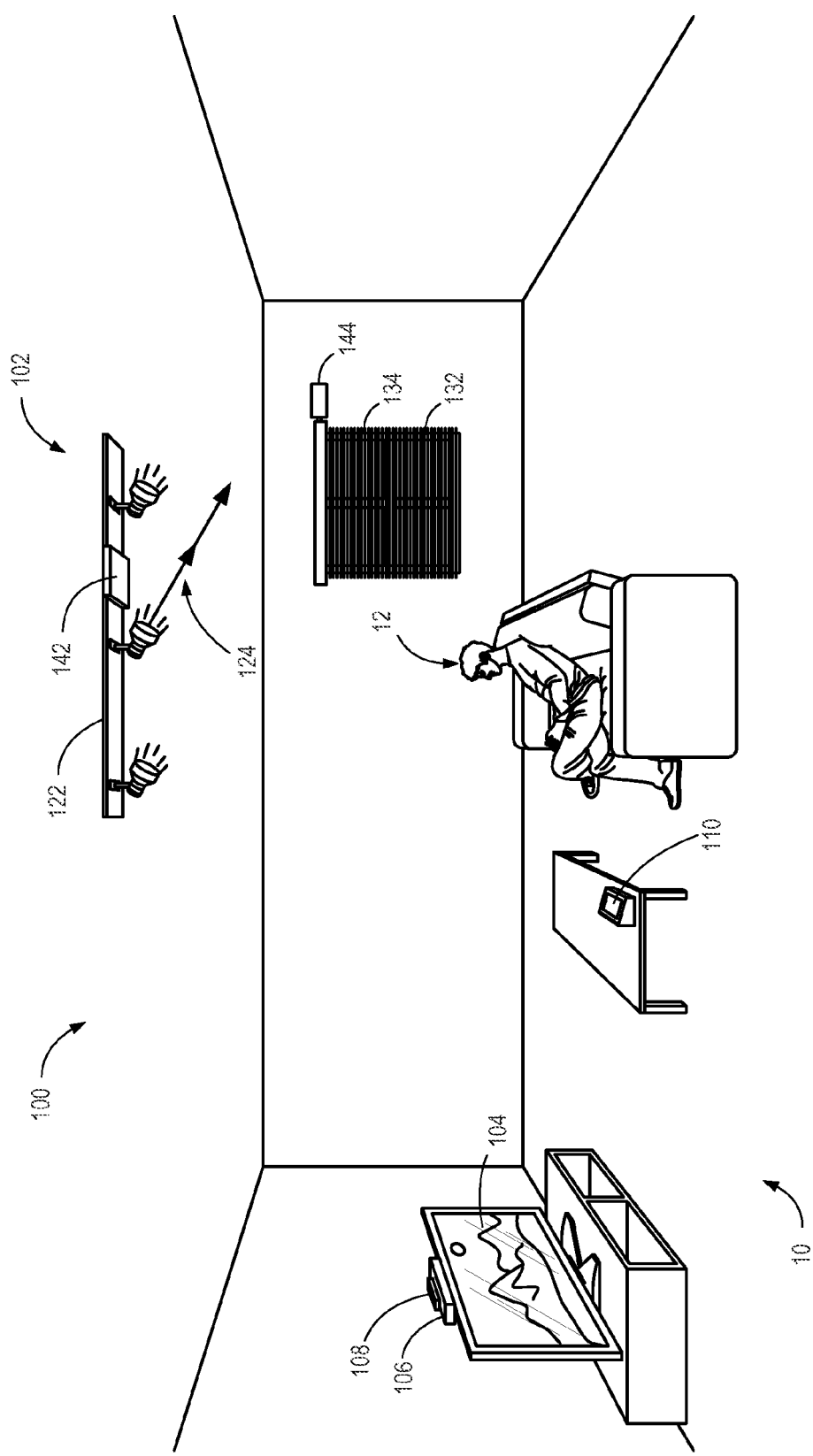
FIG. 2 is the system for controlling lighting of FIG. 1 when the operational status of the presentation display is "on."

FIG. 2 illustrates the lighting control system 100 when the operational status of the presentation display 104 is "on." The monitoring system 106 detects the operational status as being "on," and the controller 108 processes the status of the presentation display 104 and signals an adjustment to the lighting system 102. The controller 108 may process the status of the presentation display 104 based on room lighting control parameters. The room lighting control parameters may be supplied by a user, supplied by the presentation display, and/or retrieved from a database. The room lighting control parameters may be dependent on a type of the presentation display, dependent on a surface coating of the presentation display, or dependent on a reflectivity of the presentation display.

The lighting system 102 receives the signal from the controller 108 and automatically adjusts from a state when the operational status of the presentation display 104 is "off" to a new state. Specifically, the adjustment mechanism 142 adjusts the artificial light source 122 of the lighting system 102 and the adjustment mechanism 144 adjusts the natural light source 132 of the lighting system 102.

In response to a signal from the controller 108, the adjustment mechanism 142 automatically adjusts the artificial light source 122. In FIG. 2, the adjustment includes the light 124 produced by the artificial light source 122 being directed away from the presentation display 104. The adjustment also includes the artificial light source 122 being dimmed. Other adjustments to the lighting system 102 may include, but are not limited to, the lighting system 102 turning off or changing a characteristic (e.g., color, flicker rate, polarization) of lighting directed toward the presentation display 104. The adjustment may improve a viewing experience of the user 12. The adjustment mechanism 142 may include any one or more of a motor, an electronic dimmer, a mechanical dimmer (e.g., attenuator, shutter), a reflector, a shade, a polarization filter, a power setting for light emitted by the illumination source, and a spectral filter.

Also in response to a signal from the controller 108, the adjustment mechanism 144 automatically adjusts the natural light source 132. In FIG. 2, the adjustment includes the light provided by the natural light source 132 being shaded. Specifically, a shade 134 is lowered over the window 132. Other adjustments may include, but are not limited to, changing a tint of the window 132 and altering a direction of light flowing through the window 132. The adjustment mechanism 144 may include any one or more of a motor, a mechanical dimmer (e.g., attenuator, shutter), a reflector, a shade, a polarization filter, and a spectral filter.

The adjustment operation may be automated in accordance to system parameters predetermined by the user 12. The user 12 may alter the parameters through the user interface 110 to configure the adjustment according to preferences of the user 12. Altering the system parameters may change the behavior of the lighting control system 100. For example, the user 12 may alter the parameters so that lighting is directed toward the presentation display 104 when the operational status is "on."

Figure 3:
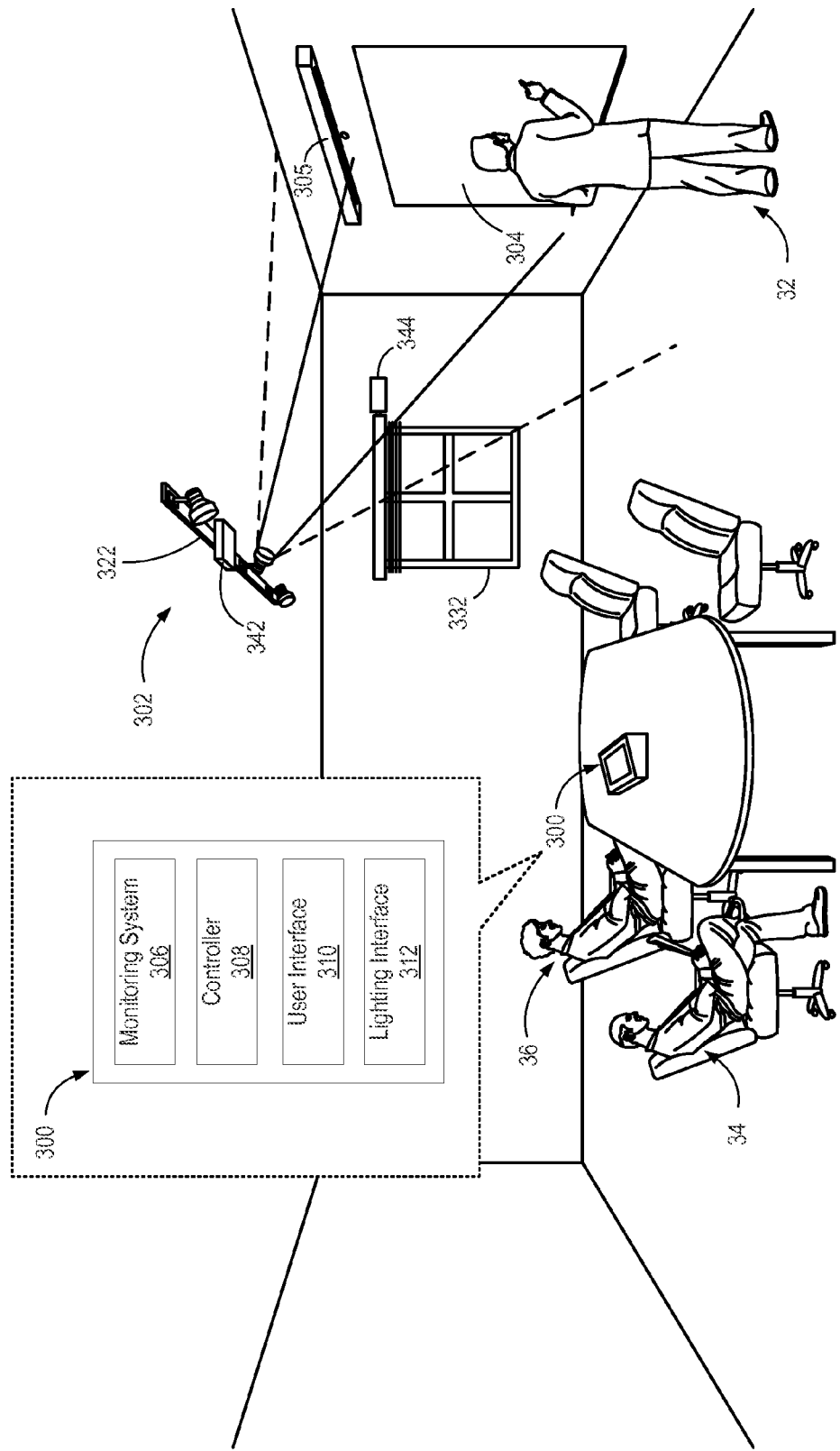
FIG. 3 is a system for controlling lighting, according to another embodiment of the present disclosure.

FIG. 3 is a lighting control system 300, according to another embodiment of the present disclosure. The lighting control system 300 is depicted in a room 30, which includes a lighting system 302 and a presentation display 304. The lighting control system 300 includes a monitoring system 306, a controller 308, a user interface 310, and a lighting interface 312. The lighting control system 300 may determine a status of the presentation display 304 and control lighting in the room 30 based on the status of the presentation display 304.

The lighting system 302 provides illumination to an area, such as the room 30. The lighting system 302 may include one or more artificial light sources 322 (e.g., electric lamp/bulb, light fixture including a plurality of electric lamps/bulbs). The lighting system 302 may also include one or more natural light sources 332 (e.g., window, sky light, light shelf, optic to direct/redirect sunshine). The lighting system 302 may be configured for a specific function or purpose, such as task lighting, decorative lighting, or accent lighting. The light sources 322, 332 may be decorative. Alternatively or in addition, the light sources 322, 332 may be functional. The lighting system 302 may also include one or more adjustment mechanisms 342, 344 to adjust the one or more light sources 322, 332. The light sources 322, 332 are adjustable. For example, the adjustment mechanism 342 may alter the intensity, color, flicker rate, polarization and/or direction of the artificial light source 322. As another example, the adjustment mechanism 344 may lower a shade to adjust the natural light source 332.

The presentation display 304 in FIG. 3 is a non-electronic whiteboard. The lighting control system 300 can monitor the status of the presentation display 304 and control the lighting based on the status of the presentation display 304. For example when a user 32 begins writing on the whiteboard presentation display 304, the system may adjust the lighting system 302 installed in the room 30 according to a command from the lighting control system 300 and/or according to preferences of the user 32 of the presentation display 304 or viewers 34, 36 of the presentation display 304 within the room 30. For example, when the whiteboard presentation display 304 is in use by the user 32, the lighting control system 300 may adjust the lighting system 302 to enhance lighting provided to the vicinity of the whiteboard presentation display 304. The lighting control system 300 may adjust the lighting system 302, for example, according to preferences stored in profiles of the user 32 and/or the viewers 34, 36.

A second presentation display 305, such as a projection screen, may also be present in the room 30. The lighting control system 300 may also monitor a status of the projection screen presentation display 305 and may control lighting in the room 30 differently based on the status of the projection screen presentation display 305. The lighting control system 300 may monitor and detect when content is being projected onto the projection screen presentation display 305 and adjust the lighting to direct light away from the projection screen presentation display 305, so as to enable improved viewing of the content projected onto the projection screen presentation display 305.

The lighting control system 300 includes the monitoring system 306, the controller 308, the user interface 310, and the lighting interface 312.

The monitoring system 306 monitors a status (e.g., one or more status characteristics) of the whiteboard presentation display 304 and/or the projection screen presentation display 305. The monitoring system 306 may monitor the display status indirectly, for example, through a sensor (or sensor network) coupled to the monitoring system 306. For example the monitoring system 306 may detect a texture or other characteristic of the presentation displays 304, 305, such as through a sensor. Based on the texture, the monitoring system 306 may determine a status of the presentation displays 304, 305. The status monitored by the monitoring system 306 may include status characteristics, including but not limited to operational status, location, direction, position, color(s) of light being emitted by the presentation displays 304, 305, intensity, brightness, or flicker rate, and other information concerning the presentation displays 304, 305. The monitoring system 306 may also receive parameters, for example from the user 32 and/or the viewers 34, 36. The monitoring system 306 may also utilize parameters that may be preprogrammed or otherwise configured. For example, system parameters for the lighting control system 300 may be set or otherwise configured, or the monitoring system 306 may be preprogrammed with parameters including information about the presentation display(s) 304, 305 and use such parameters to derive status characteristics. The monitoring system 306 of the embodiment of FIG. 3 is remote from the presentation displays 304, 305. Based on the status of the presentation displays 304, 305 as monitored by the monitoring system 306, the lighting control system 300 may adjust the lighting system 302.

The controller 308 processes the monitored status of the presentation display 304 and signals to, for example, the lighting system 302 and/or the adjustment mechanisms 342, 344 to adjust the light sources 322, 332 of the lighting system 302 based on the status of the presentation display 304. The controller 308 may direct changes to the lighting system 302 based on preprogrammed parameters or input, which may be received via the user interface 310. The input from the user interface 310 may specify parameters and/or indicate an action the controller 308 is to direct, based on a present monitored status of the presentation display 304 and/or change thereof. For example in one embodiment, when the status of the whiteboard presentation display 304 is "in use," the controller 308 may adjust the lighting system 302 to direct light toward the presentation display 304, and when the status of the projection screen presentation display 305 is "in use," the controller 308 may direct light away from the presentation display 305. The controller 308 may direct the lighting system 302 in any manner that may be desirable, convenient, and/or useful to the viewers 34, 36 of the presentation display 304 of the lighting control system 300, or otherwise configurable.

The user interface 310 may enable the user 32 and/or the viewers 34, 36 to provide input or parameters to the lighting control system 300, such as to the controller 308. The user interface 310 may present information concerning the lighting control system 300, such as a status monitored by the monitoring system 306, an action or instructions provided to the lighting system 302 by the controller 308, and a current state (e.g., before or after an adjustment) of the lighting system 302. In the embodiment of FIG. 3, the user interface 310 is integrated with the components of the lighting control system 300, including the monitoring system 306, the controller 308, and the lighting interface 312. The user interface 310 may include one or more of a touch screen, a switch, and an input peripheral (e.g., a mouse, microphone, or keyboard).

The lighting interface 312 of the lighting control system 300 transmits the command generated by the controller 308 to the lighting system 302, which is configured to receive the command and effectuate an adjustment of the lighting generated by the lighting system 302. The lighting interface may transmit the command over a communication network, such as a wireless communication network or channel. The lighting interface 312 may also receive data from the lighting system 302, such as status information of the lighting system 302, for example, in response to or prior to a command to adjust the lighting.

Figure 4:
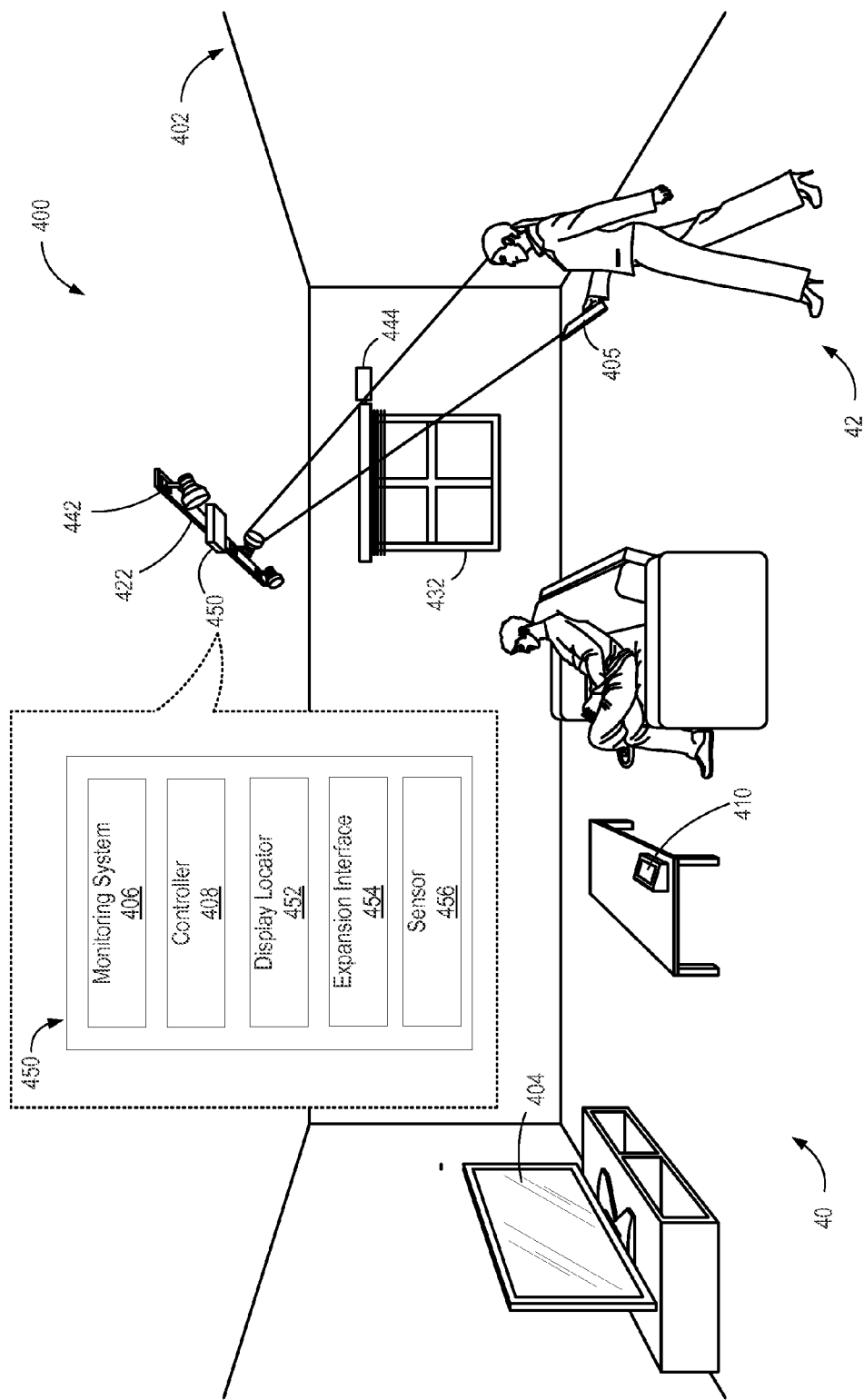
FIG. 4 is a system for controlling lighting, according to another embodiment of the present disclosure.

FIG. 4 is a lighting control system 400, according to another embodiment of the present disclosure. The lighting control system 400 is depicted in a room 40 with both a fixed presentation display 404 and a mobile presentation display 405. The lighting control system 400 includes a lighting system 402, which includes an artificial light source 422 and a display detector 450. The artificial light source 422 may be a light fixture (with one or more electric bulbs) and an adjustment mechanism 442. The display detector 450 may include a monitoring system 406, a controller 408, and a display locator 452. The lighting control system 400 may determine a status of one or both of the presentation displays 404, 405 and control lighting in the room 40 based on the determined status. The lighting control system 400 may further integrate with an external adjustment mechanism 444 for adjusting a natural light source 432 (e.g., a window) within the room 40.

The fixed presentation display 404 may be similar to the presentation display 104 shown in FIG. 1 and described above with reference to the same. The fixed presentation display 404 may be configured to present information and/or content. In FIG. 4, the fixed presentation display 404 is a flat screen television. As can be appreciated, other types of fixed presentation displays are possible, such as a computer monitor, a projector screen, a white board, a chalkboard, and the like. The fixed presentation display 404 may be electronic or it may be non-electronic. The fixed presentation display 404 may be any type of display used to present information or content.

The mobile presentation display 405 may be mobile. For example, the mobile presentation display 405 may be a tablet computer or a cellular phone. The mobile presentation display 405 may be configured to present information and/or content. As a user 42 moves the mobile presentation display 405 about the room 40, the lighting control system 400, and specifically the display detector 450, may detect the mobile presentation display 405 and modify or adjust lighting in the room 40 based on a monitored status of the mobile presentation display 405 and/or a monitored status of the fixed presentation display 404.

The lighting system 402 provides illumination to the room 40 and adjusts the lighting according to a monitored status of the presentation display(s) 404, 405. The lighting system 402 may include one or more artificial light sources 422 (e.g., electric lamp/bulb, light fixture including a plurality of electric lamps/bulbs). The lighting system 402 may be configured for a specific function or purpose, such as task lighting, decorative lighting, or accent lighting. The light source 422 may be decorative. Alternatively or in addition, the light sources 422 may be functional. The lighting system 402 may also include one or more adjustment mechanisms 442. The light sources 422 are adjustable by the adjustment mechanism 442. For example, the adjustment mechanism 442 may alter the intensity, color, flicker rate, polarization, and/or direction of the artificial light source 422.

The display detector 450 may be coupled to the lighting system 402. In FIG. 4, the display detector 450 is directly coupled, or integral, to the lighting system 402. The display detector 450 functions to detect one or more presentation displays 404, 405 in the room 40, and more particularly to detect the mobile presentation display 405 and movement thereof. The display detector 450 of FIG. 4 includes the monitoring system 406, the controller 408, and the display locator 452. The display detector 450 may also include an expansion interface 454 to pair with or otherwise integrate with external components, such as the external adjustment mechanism 444 for the natural light source 432, an additional monitoring system, an additional controller, or the like.

The display locator 452 may detect a presence and/or location of the mobile presentation display 405 and/or track movement of the location of the mobile presentation display 405 within the room 40. The display locator 452 may include imagers, sensors, receivers and/or transmitters, geolocation equipment, or the like to sense or otherwise detect the mobile presentation display 405.

The monitoring system 406 monitors a status (e.g., one or more status characteristics) of the fixed presentation display 404 and/or the mobile presentation display 405. The monitoring system 406 may monitor the status through a sensor 456 (or sensor network) coupled to the monitoring system 406. For example the monitoring system 406 may detect characteristics, such as a texture, light, color, and the like, of the presentation displays 404, 405. Based on sensed characteristics of the presentation displays 404, 405, the monitoring system 406 may determine a status of one or both of the presentation displays 404, 405. The status monitored by the monitoring system 406 may include multiple status characteristics, including but not limited to operational status, location, direction, position, polarization, color(s) of light being emitted by the presentation displays 404, 405, intensity, brightness, or flicker rate of the presentation displays 404, 405. The monitoring system 406 may also receive parameters, for example from the user 42. The monitoring system 406 may also utilize parameters that may be preprogrammed or otherwise configured. For example, system parameters for the lighting control system 400 may be set or otherwise configured, or the monitoring system 406 may be preprogrammed with parameters including information about the presentation display(s) 404, 405 and use such parameters to derive status characteristics. The monitoring system 406 of the embodiment of FIG. 4 is remote from the presentation displays 404, 405. Based on the status of the presentation displays 404, 405 as monitored by the monitoring system 406, the lighting control system 400 may adjust the lighting system 402.

The controller 408 processes the monitored status of the presentation display 404 and signals to, for example, the adjustment mechanisms 442 to adjust the light source 422 of the lighting system 402 based on the status of the presentation display(s) 404, 405. The controller 408 may direct changes to the lighting system 402 based on preprogrammed parameters or input, which may be received via the user interface 410. The controller 408 may direct the lighting system 402 to adjust in any manner that may be desirable, convenient, and/or useful to a viewer of the fixed presentation display 404 and or the user 42 of the mobile presentation display 405.

Figure 5:
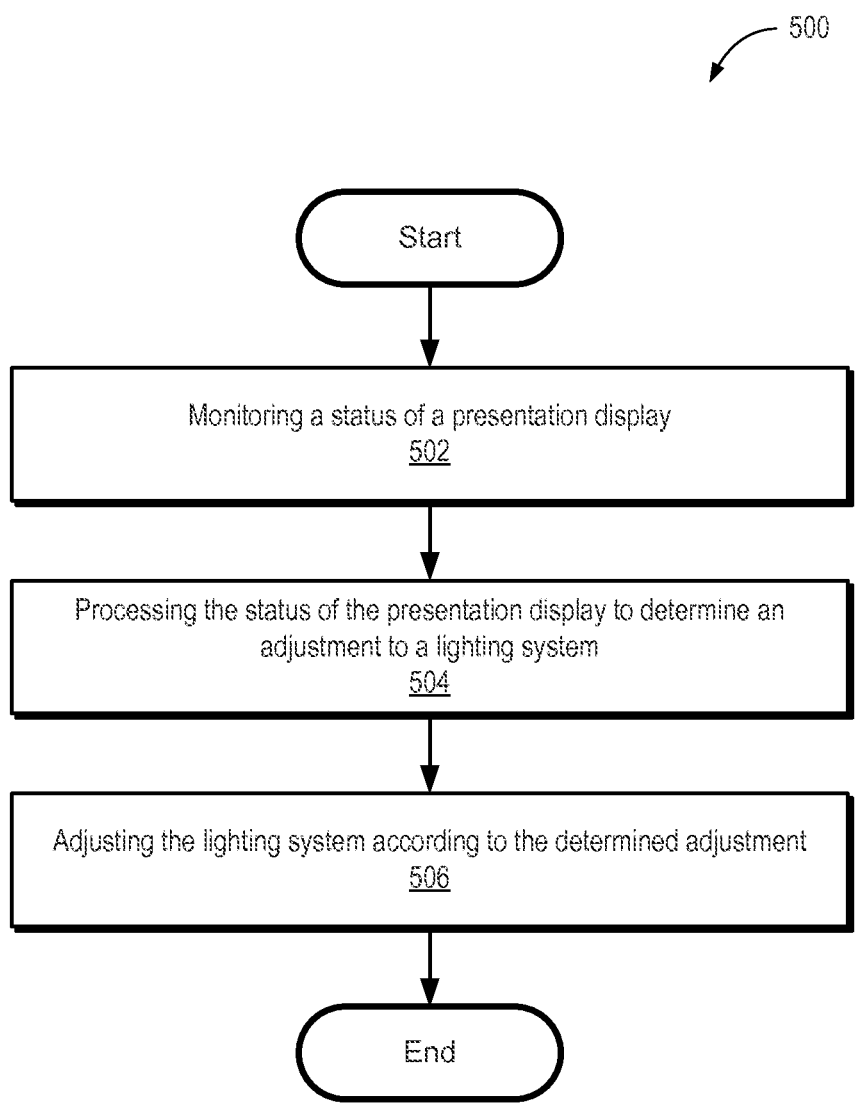
FIG. 5 is a flow diagram of a method for controlling lighting based on a status of a presentation display, according to another embodiment of the present disclosure.

FIG. 5 is a flow diagram of a method 500 for controlling lighting based on a status of a presentation display, according to another embodiment of the present disclosure. The method 500 may be implemented by a computer or other processing device. A status of a presentation display is monitored 502 or otherwise detected. The presentation display may be electronic or non-electronic, as described previously. The monitoring 502 may be by a monitoring system internal to and/or external to the presentation display. The status of the presentation display is processed 504 to determine an adjustment to a light source of a lighting system associated with the presentation display. The processing 504 may determine an appropriate adjustment based on the status of the presentation display. The processing 504 to determine the appropriate adjustment may also include considering parameters and/or input provided, and based on the area to which the lighting system provides light. The lighting system (e.g., a light source of the lighting system) is then adjusted 506 according to the determined adjustment.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A system for controlling lighting, comprising:
   a lighting system to provide light to an area, the lighting system including a light source and an adjustment mechanism to adjust the light source;
   a first and a second presentation display;
   a monitoring system to monitor a status of the first and the second presentation displays;
   a storage device configured to store a plurality of different user profiles, each user profile of the plurality of different user profiles including different user preferences for operating the lighting system for a plurality of different users of the lighting system; and
   a controller to process the status of the first and the second presentation displays and to signal the lighting system to activate the adjustment mechanism to adjust the light source, based on the status of the first and the second presentation displays, wherein the controller signals the adjustment mechanism based on a user preference corresponding to a user profile of a user using the lighting system for the status of the presentation display, the user profile defining a first adjustment to the light source when one of the displays is in use and a second adjustment to the light source when both of the displays are in use.

2. The system of claim 1, wherein the controller signals the lighting system to adjust an intensity of the light source.

3. The system of claim 1, wherein the controller signals the adjustment mechanism to adjust a polarization of light emitted by the light source.

4. The system of claim 1, wherein the controller signals the adjustment mechanism to adjust a direction of the light source.

5. The system of claim 1, wherein the controller signals the adjustment mechanism to adjust a flicker rate of the light source.

6. The system of claim 1, wherein the controller is configured to process the status of the first and the second presentation displays based on room lighting control parameters supplied by a user of the system.

7. The system of claim 1, wherein the status of the first and the second presentation displays comprises an operational status of the first and the second presentation displays.

8. The system of claim 7, wherein the operational status of the first and the second presentation displays comprises a location of the first and the second presentation displays.

9. The system of claim 7, wherein the operational status of the first and the second presentation displays comprises an illumination characteristic of the first and the second presentation displays.

10. The system of claim 1, wherein the status of the first and the second presentation displays comprises an intensity of the first and the second presentation displays.

11. The system of claim 1, wherein the status of the first and the second presentation displays comprises a level of color in light being emitted by the first and the second presentation displays.

12. The system of claim 1, wherein the controller is configured to signal the adjustment mechanism based, at least in part, on room lighting control parameters supplied by a user of the system.

13. The system of claim 1, further comprising a user interface configured to enable a user to provide at least one of input or parameters to the controller.

14. A computer-implemented method for controlling lighting, comprising:
   monitoring a status of a first and a second presentation display;
   processing the status of the first and the second presentation displays to determine an adjustment to a light source of a lighting system associated with the first and the second presentation displays, the adjustment determined based on the status of the first and the second presentation displays, the lighting system to provide light to an area;
   storing a plurality of different user profiles, each user profile of the plurality of different user profiles including different user preferences for operating the lighting system for a plurality of different users of the lighting system, the user profile defining a first adjustment to the lighting system when one of the displays is in use and a second adjustment to the lighting system when both of the displays are in use;
   signaling an adjustment mechanism to adjust the light source based on a user preference corresponding to a user profile of a user using the lighting system for the status of the first and the second presentation displays; and
   adjusting the light source of the lighting system according to the determined adjustment.

15. The method of claim 14, wherein adjusting the light source comprises adjusting an intensity of the light source.

16. The method of claim 14, wherein adjusting the light source comprises adjusting a polarization of light emitted by the light source.

17. The method of claim 14, wherein adjusting the light source comprises adjusting a direction of the light source.

18. The method of claim 14, wherein adjusting the light source comprises adjusting a flicker rate of the light source.

19. The method of claim 14, wherein the status of first and the second presentation displays comprises an operational status of the first and the second presentation displays.

20. The method of claim 19, wherein at least one of the presentation displays comprises a fixed presentation display, and wherein the operational status of the fixed presentation display comprises a location of the fixed presentation display in the room.

21. The method of claim 14, wherein the status of the first and the second presentation displays comprises an intensity of the first and the second presentation displays.

22. The method of claim 14, wherein the status of the first and the second presentation displays comprises a level of color in light being emitted by the first and the second presentation displays.

23. The method of claim 14, wherein adjusting the light source is accomplished via the adjustment mechanism.

24. A lighting system, comprising:
   a light source to emit light to provide a region of illumination;

a display detector to detect a first and a second presentation display in the room and determine a status of the first and the second presentation displays;

an adjustment mechanism to adjust the light source, based on the status of the first and the second presentation displays;

a storage device configured to store a plurality of different user profiles, each user profile of the plurality of different user profiles including different user preferences for operating the lighting system for a plurality of different users of the lighting system, the user profiles defining a first adjustment to the light source when one of the displays is in use and a second adjustment to the light source when both of the displays are in use; and a controller configured to signal the adjustment mechanism to adjust the light source, the signaling based on a user preference corresponding to a user profile of a user using the lighting system for the status of the first and the second presentation displays.

25. The system of claim 24, wherein the display detector comprises a sensor.

26. The system of claim 24, wherein at least one of the presentation displays comprises an electronic display configured to present electronic images.

27. The system of claim 24, wherein the lighting system comprises a plurality of light sources, including both a natural light source and an artificial light source.

28. One or more non-transitory computer-readable storage medium having stored thereon, instruction that, when executed by one or more computing devices, cause the one or more computing devices to perform operations for controlling lighting, the operations comprising:

monitoring a status of a first and a second presentation display via a monitoring system disposed external to the presentation display;

processing the status of the first and the second presentation displays to determine an adjustment to a light source of a lighting system associated with the first and the second presentation displays, the adjustment determined based on the status of the first and the second presentation displays, the lighting system to provide light to an area;

storing a plurality of different user profiles, each user profile of the plurality of different user profiles including different user preferences for operating the lighting system for a plurality of different users of the lighting system, the user profile defining a first adjustment to the lighting system when one of the displays is in use and a second adjustment to the lighting system when both of the displays are in use;

signaling an adjustment mechanism to adjust the light source based on a user preference corresponding to a user profile of a user using the lighting system for the status of the first and the second presentation displays; and adjusting the light source of the lighting system according to the determined adjustment.

* * * * *

UNITED STATES PATENT AND TRADEMARK OFFICE
CERTIFICATE OF CORRECTION

| | | |
|---|---|---|
| PATENT NO. | : 9,678,494 B2 | Page 1 of 1 |
| APPLICATION NO. | : 14/677778 | |
| DATED | : June 13, 2017 | |
| INVENTOR(S) | : Roderick A. Hyde et al. | |

It is certified that error appears in the above-identified patent and that said Letters Patent is hereby corrected as shown below:

In the Claims

Column 20, Line 48, Claim 19:
"wherein the status of first and"
Should read:
--wherein the status of the first and--

Signed and Sealed this
Tenth Day of October, 2017

Joseph Matal
*Performing the Functions and Duties of the*
*Under Secretary of Commerce for Intellectual Property and*
*Director of the United States Patent and Trademark Office*